United States Patent [19]

Commins

[11] Patent Number: 5,274,981
[45] Date of Patent: Jan. 4, 1994

[54] RIM TIE CONNECTION

[75] Inventor: Alfred D. Commins, Danville, Calif.

[73] Assignee: Simpson Strong-Tie Company, Inc., San Leandro, Calif.

[21] Appl. No.: 848,429

[22] Filed: Mar. 6, 1992

[51] Int. Cl.$^5$ .............................................. E04B 1/38
[52] U.S. Cl. .................................... 52/712; 403/232.1
[58] Field of Search ...................... 52/712, 714, 715; 403/232.1, 230

[56] References Cited

U.S. PATENT DOCUMENTS 4,817,359  4/1989  Colonias .................... 403/232.1 X
4,897,979  2/1990  Colonias ........................ 52/712 X Primary Examiner—Carl D. Friedman
Assistant Examiner—C. Smith
Attorney, Agent, or Firm—James R. Cypher

[57] ABSTRACT

A rim tie connection for building structures including a wood post member, first and second wood rim members and a sheet metal connector. One specialized use of the rim tie connection is in constructing the floor support framing in gazebo structures. In such structures the wood post member is generally in a vertical position and the wood rim members are in a generally horizontal position. The sheet metal connector ties the ends of the wood rim members together and to the wood post member. The sheet metal connector includes a seat member, for holding the wood rim members and a back member for attachment to the front face of the wood post member. Floor boards attached to and supported by the wood rim members need not be notched to fit around the post member as in prior practice.

4 Claims, 4 Drawing Sheets

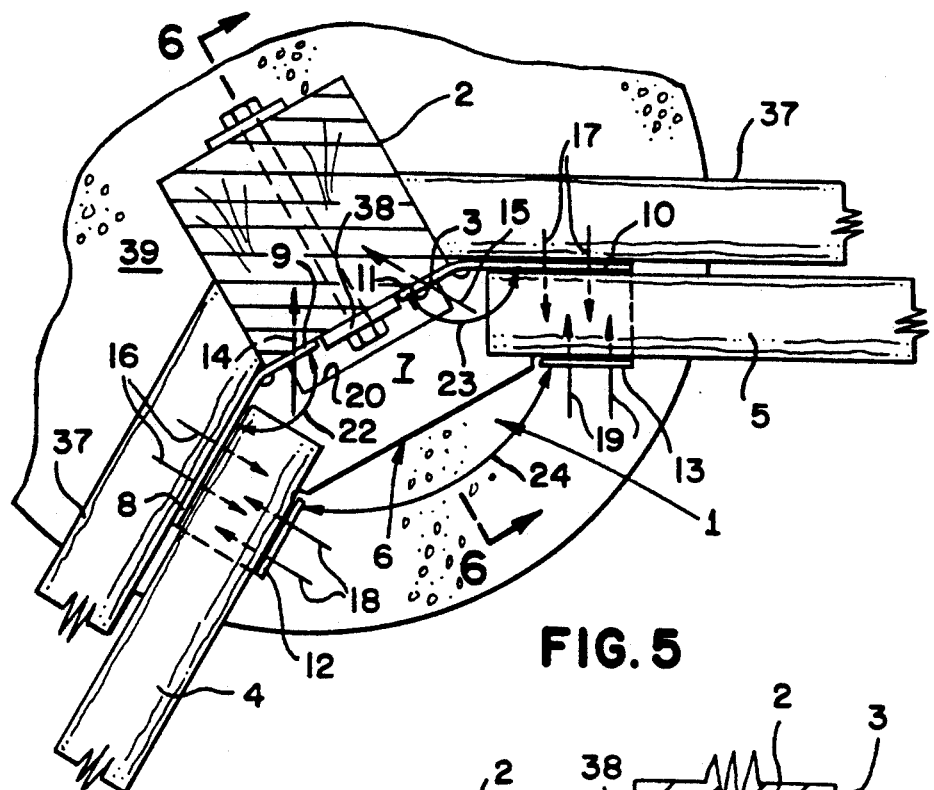
FIG. 5
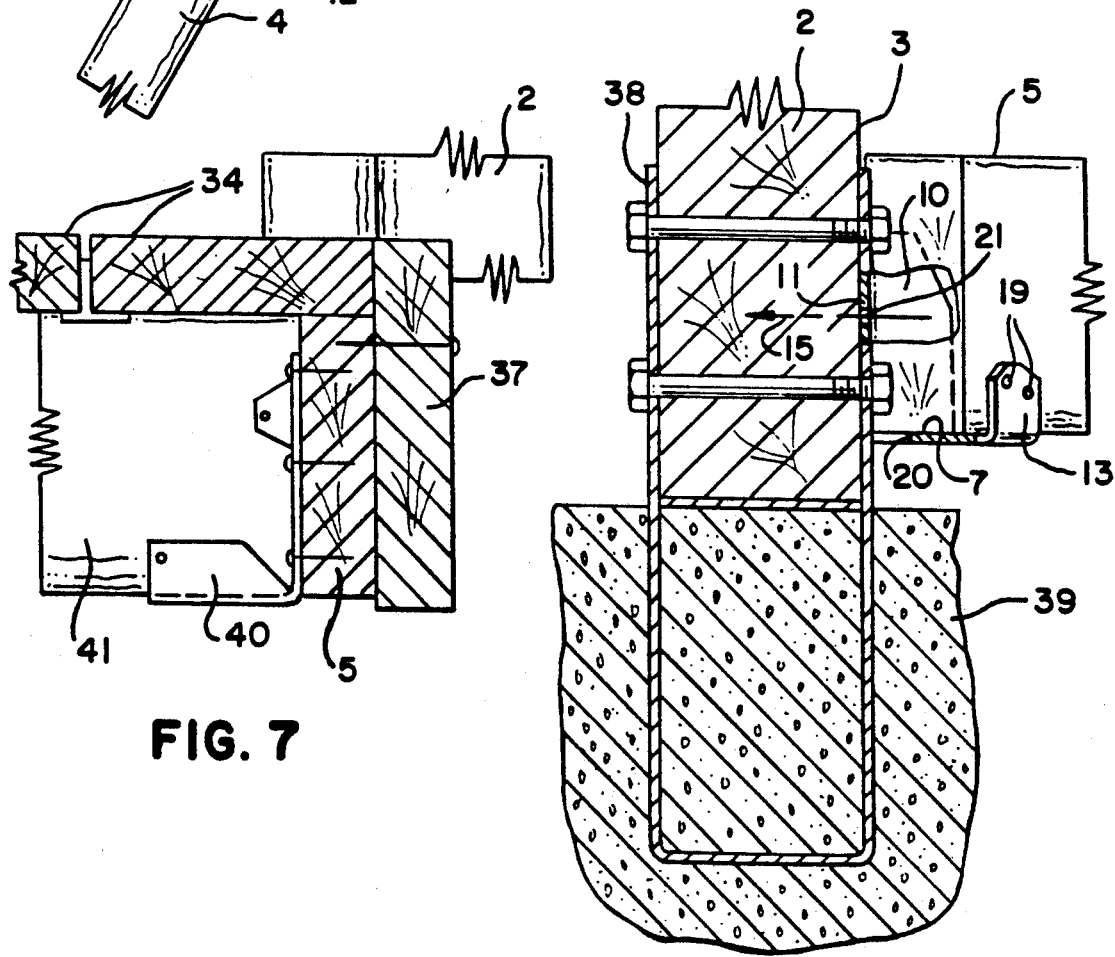
FIG. 7
FIG. 6

RIM TIE CONNECTION

BACKGROUND

This invention relates to a rim tie connection in a building structure. This connection is found where two abutting wood members are each connected to the face of an upright member such as a post. This connection may specifically be found in such applications as attaching wood rails to wood fence posts or in an even more specific application of attaching the bottom rim wood members to the face of a post in constructing a multi-sided gazebo structure.

Present practice is to attach the wood rim members directly to the post member with nails or screws without the use of any sheet metal connector. Because there is limited end distance in the abutting wood rim members, and limited edge distance in the post member, wood splitting is common in driving the attaching nails.

In constructing a gazebo structure, because the wood rim members form an obtuse angle with the wood post and an obtuse angle with each other, it is necessary to make angle cuts in the ends of the abutting wood rim members.

SUMMARY OF THE INVENTION

The present invention provides a one piece, non-welded sheet metal connector to attach the wood rim members to the wood post member.

End and edge splitting of the wood members is reduced with the use of the sheet metal rim tie connector of the present invention.

Angle cutting of the ends of the wood rim members is eliminated through the use of a sheet metal rim tie connector which is factory pre-bent to the correct angle.

BRIEF DESCRIPTION OF THE DRAWINGS

FIG. 5 is a top plan view of the rim tie connection of the present invention taken generally within the line 5—5 of FIG. 4.

FIG. 6 is a cross sectional view of a portion of the rim tie connection illustrated in FIG. 5 and taken generally along line 6—6.

FIG. 7 is a cross sectional view of a portion of a gazebo structure illustrated in FIG. 4 taken generally along line 7—7 in which the rim tie connection of the present invention is used.

DESCRIPTION OF THE PREFERRED EMBODIMENTS

Figure 1:
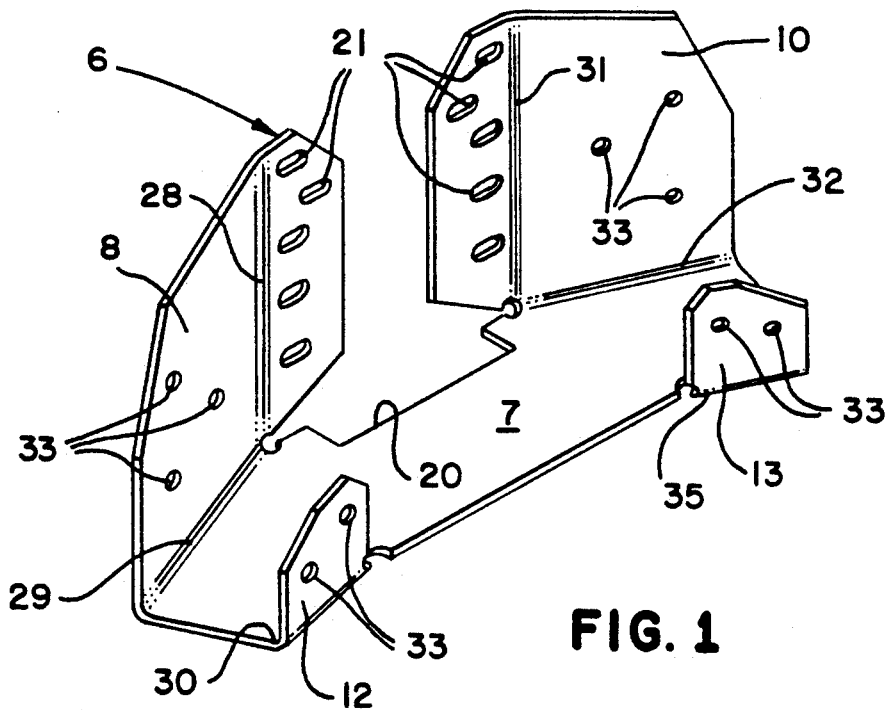
FIG. 1 is a perspective view of the rim tie connector of the present invention.
Figure 2:
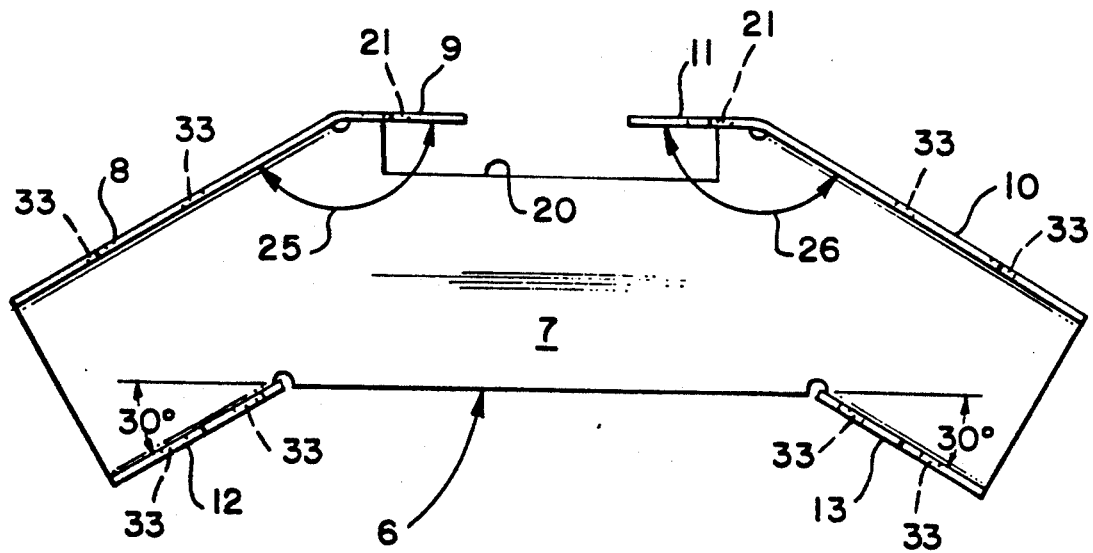
FIG. 2 is a top plan view of the rim tie connector illustrated in FIG. 1.
Figure 3:
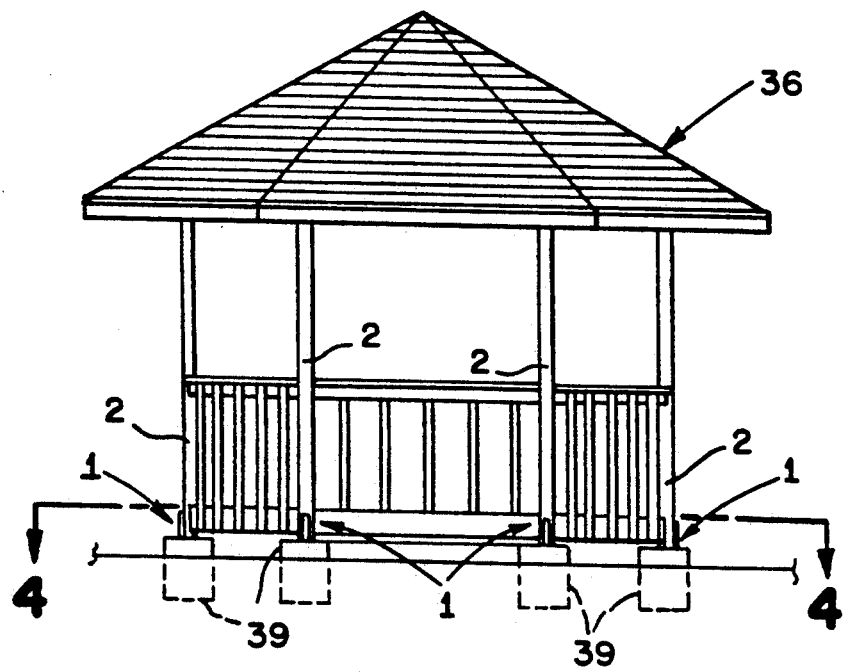
FIG. 3 is a side view of a gazebo structure illustrating an environment for one form of the rim tie connection of the present invention.
Figure 4:
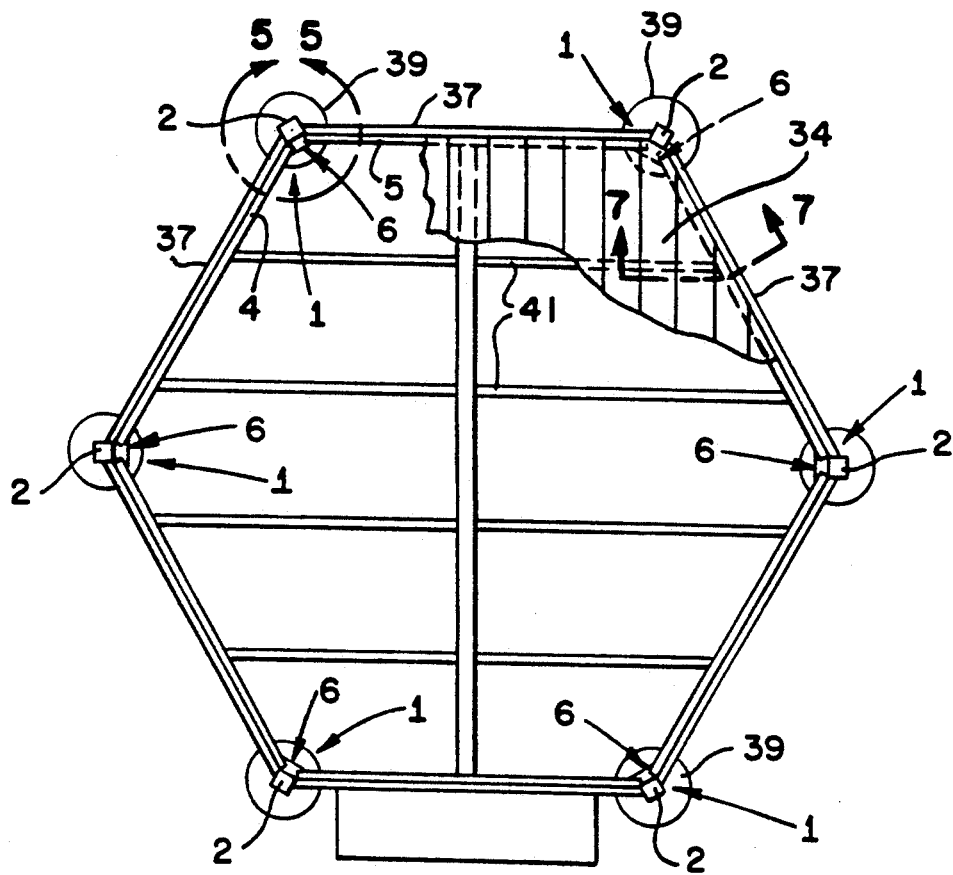
FIG. 4 is a sectional view of the gazebo structure taken generally along line 4—4 of FIG. 3 with portions cut away to further illustrate the environment for one form of the rim tie connection of the present invention.

The present invention is a rim tie connection 1 in a gazebo 36 or other type of building structure comprising: a wood post member 2 having a generally planar face 3 and disposed generally vertically; first and second wood rim members 4 and 5 disposed in the same horizontal plane on either side of the wood post member 2; and a a rim tie connector 6 constructed from a single sheet of sheet metal.

The rim tie connector 6 includes: a seat member 7, a first side member 8 integrally connected to the seat member 7 and disposed at a generally 90° angle thereto, a first back member 9 integrally connected to the first side member 8; a second side member 10 spaced from the first side member 8 and integrally connected to the seat member 7 and disposed at a generally 90° angle therewith, a second back member 11 integrally connected to the second side member 10 in generally the same plane as the first back member 9, a first flange member 12 spaced from the first side member 8 a selected distance for receiving the first wood rim member 4 and disposed in generally parallel relation to the first side member 8 and integrally connected to the seat member 7, and a second flange member 13 spaced from the second side member 10 a selected distance for receiving the second wood rim member 5 and disposed in generally parallel relation to the second side member 10 and integrally connected to the seat member 7.

The rim tie connector is fastened to the wood members by first fastener means 14 connecting the first back member 9 to the wood post member 2; second fastener means 15 connecting the second back member 11 to the wood post member 2; third fastener means 16 connecting the first side member 8 to the first wood rim member 4; fourth fastener means 17 connecting the second side member 10 to the second wood rim member 5; fifth fastener means 18 connecting the first flange member 12 to the first wood rim member 4; and sixth fastener means 19 connecting the second flange member 13 to the second wood rim member 5. Preferably the rim tie connector 6 is formed so that the seat member 7 is formed with a cut out portion 20 forming an elongated opening inwardly of the first and second back members 9 and 11. This eliminates interference with other connectors attached to the foundation and to the post member 2. In addition it is preferred that slant fastening opening means 21 be formed in the first and second back members 9 and 11. This structure permits slant fastening of the rim tie connector 6 to the wood post member 2 to avoid splitting of the wood post member 2.

Although the rim tie to post connection 1 may be such that the first and second wood rim members 4 and 5 are parallel to one another, in most applications, the first and second wood rim members 4 and 5 each form an angle 22 and 23 with the face 3 of the wood post member 2 and form an angle 24 to each other. The rim tie connector 6 is constructed so that the first back member 9 forms an angle 25 with the first side member 8; and the second back member 11 of the rim tie connector 6 forms an angle 26 with the second side member 10.

In the form of the rim tie connection 1 illustrated in the drawings, first and second wood rim members 4 and 5 are disposed in the same horizontal plane on either side of the wood post member 2 and each form an obtuse angle 22 and 23 with the face 3 of the wood post member 2 forming an obtuse angle to each other.

Figure 8:
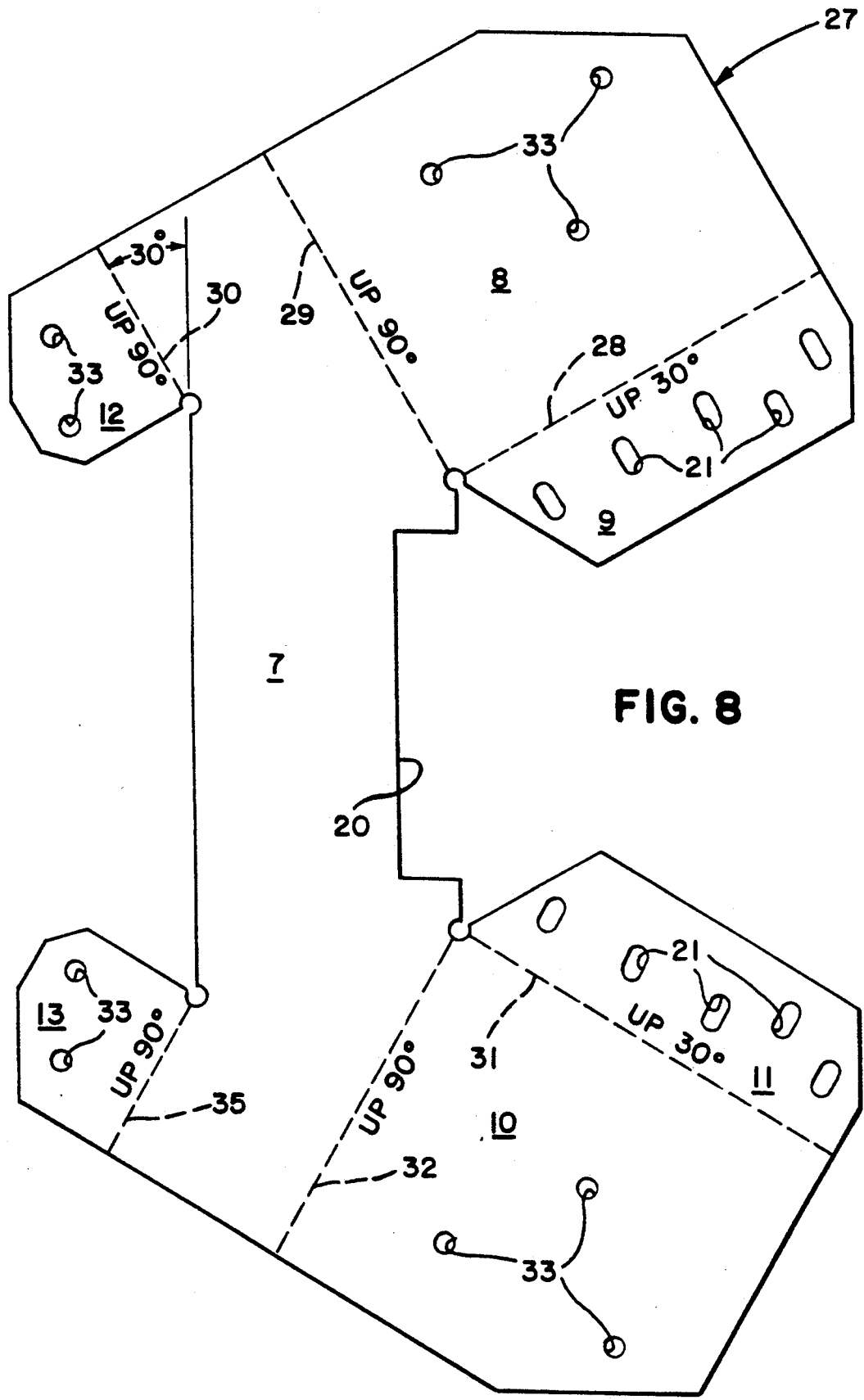
FIG. 8 is a top plan view of a blank of sheet metal from which the rim tie connector of the present invention illustrated in FIGS. 1 and 2 is constructed.

Rim tie connector 6 is constructed from a single non-welded sheet metal blank 27 as illustrated in FIG. 8. The material used may be 16 gauge galvanized. The blank may have dimensions of 10.75"×6.75" for a total square area of 72.56 sq. in. Weight of a typical rim tie connector 6 is 1.26 lbs. The part is symmetrical about a center line. The circular openings 33 are 0.1719" diameter and the slotted openings 21 are 0.1719"×0.3125". The seat member 7 at its narrowest opening is 3.56" between side members 8 and 10 and at its widest dimension between the inside edges of first and second flange members 12 and 13 it is 4.67".

The first and second side members 8 and 10 have a height of 3.4375 inches and a width of 3". First and second back members 9 and 11 have a height of 3.4375" and a width of 1.12". First and second flange members 12 and 13 have a width of 1.48" and a height of 1.25". Seat width between the side members and the flange members is 1.5625". Cut out portion 20 has a width of 2¾" and a depth of 1 ⅛".

The rim tie connector 6 is constructed from sheet metal blank 27 by first cutting as illustrated in FIG. 8, punching the openings and then bending first side member 8 up 90° along bend line 29 and then bending first back member 9 along bend line 28 30°. First flange member 12 is then bent up 90° along bend line 30. Second side member 10 is then bent up 90° along bend line 32 and second back member 11 is bent 30° along bend line 31. Finally second flange member 13 is bent up 90° along bend line 35.

Installation of the rim tie connection is as follows: Rim tie connector 6 is attached to wood post 2 at a selected elevation by driving first fastener means 14 through obround openings 21 in first back member 9 either straight in or at an angle into wood post member 2. Second fastener means 15 are then driven either straight in or at an angle through obround openings 21 in second back member 11 into wood post member 2.

First wood rim member 4 is then positioned on seat 7 between first side member 8 and first flange member 12. Fourth fastener means 16 are then driven through openings 33 in first side member 8 into first wood rim member 4, and fifth fastener means 18 are driven through openings 33 in first flange member 12 into first wood rim member 4.

Next, second wood rim member 5 is positioned on seat 7 between second side member 10 and second flange member 13 and fourth fastener means 17 are driven through openings 33 in second side member 10 into second wood rim member 5 and sixth fastener means 19 are driven through openings 33 in second flange member 13 into second wood rim member 5.

With the rim tie connector 6 of the present invention, three structural members are connected together; viz., wood post member 2, and first and second wood rim tie members 4 and 5. Moreover, wood decking members 34 attached to the first and second wood rim tie members 4 and 5 need not be notched since the wood post member 2 does not extend inwardly of the location of the first and second wood rim tie members 4 and 5.

In a gazebo structure a skirt board 37 may be nailed to the outside of first and second wood rim boards 4 and 5. Sheet metal hangers 40 are attached to first and second rim boards 4 and 5 and carry joist members 41 which in turn carry wood deck boards 34.

Foundation connectors 38 embedded in concrete foundations 39 are attached to wood post members 2.

I claim:

1. A rim tie connection in a building structure comprising:
   a. a wood post member having laterally spaced first and second edges and a generally planar face and disposed generally vertically;
   b. first and second wood rim members disposed in the same horizontal plane on either side of said wood post member;
   c. a rim tie connector constructed from a single sheet of sheet metal and including:
      1. a seat member,
      2. a first side member integrally connected to said seat member and disposed at a generally 90° angle thereto,
      3. a first back member integrally connected to said first side member and positioned in registration with a portion of said generally planar face of said wood post member adjacent said first edge of said wood post member and interposed between said planar face of said wood post member and said seat member,
      4. a second side member spaced from said first side member at a horizontally angle of 90° or greater and integrally connected to said seat member and disposed at a generally 90° angle therewith,
      5. a second back member integrally connected to said second side member in generally the same plane as said first back member and positioned in registration with a portion of said generally planar face of said wood post member adjacent said second edge of said wood post member, and laterally spaced from said first back member leaving an unobstructed area therebetween for the mounting of other connectors on the unobstructed area of said generally planar face of said wood post member and interposed between said planar face of said wood post member and said seat member,
      6. a first flange member spaced from said first side member a selected distance for receiving said first wood rim member and disposed in generally parallel relation to said first side member and integrally connected to said seat member,
      7. a second flange member spaced from said second side member a selected distance for receiving said second wood rim member and disposed in generally parallel relation to said second side member and integrally connected to said seat member;
   d. first fastener means connecting said first back member to said wood post member;
   e. second fastener means connecting said second back member to said wood post member;
   f. third fastener means connecting said first side member to said first wood rim member;
   g. fourth fastener means connecting said second side member to said second wood rim member;
   h. fifth fastener means connecting said first flange member to said first wood rim member; and
   i. sixth fastener means connecting said second flange member to said second wood rim member.

2. A rim tie to post connection as described in claim 1 wherein:
   a. said seat member of said rim tie connector is formed with a cut out portion forming an elongated opening inwardly of said first and second back members; and
   b. slant fastening opening means formed in said first and second back members enabling said first and second fastener means to be driven through said slant fastening and opening means at an angle away from said first and second edges and toward the center of said wood post member to prevent wood splitting of said wood post member.

3. A rim tie connection in a gazebo structure comprising:
   a. a wood post member having laterally spaced first and second edges and a generally planar face and disposed generally vertically;
   b. first and second wood rim members disposed in the same horizontal plane on either side of said wood post member each forming an obtuse angle with said face of said wood post member and forming an obtuse angle to each other;
   c. a rim tie connector constructed from a single sheet of sheet metal and including:
      1. a seat member,
      2. a first side member integrally connected to said seat member and disposed at a generally 90° angle thereto,
      3. a first back member integrally connected to said first side member and forming an obtuse angle therewith and positioned in registration with a portion of said generally planar face of said wood post member adjacent said first edge of said wood post member and interposed between said planar face of said wood post member and said seat member,
      4. a second side member spaced from said first side member at a horizontal angle of 90° or greater and integrally connected to said seat member and disposed at a generally 90° angle therewith,
      5. a second back member integrally connected to said second side member and forming an obtuse angle therewith and disposed in generally the same plane as said first back member and positioned in registration with a portion of said generally planar face of said wood post member adjacent said second edge of said wood post member, and laterally spaced from said first back member leaving an unobstructed area therebetween for the mounting of other connectors on the unobstructed area of said generally planar face of said wood post member and interposed between said planar face of said wood post member and said seat member,
      6. a first flange member spaced from said first side member a selected distance for receiving said first bottom rim member and disposed in generally parallel relation to said first side member and integrally connected to said seat member,
      7. a second flange member spaced from said second side member a selected distance for receiving said second bottom rim member and disposed in generally parallel relation to said second side member and integrally connected to said seat member;
   d. first fastener means connecting said first back member to said wood post member;
   e. second fastener means connecting said second back member to said wood post member;
   f. third fastener means connecting said first side member to said first wood rim member;
   g. fourth fastener means connecting said second side member to said second wood rim member;
   h. fifth fastener means connecting said first flange member to said first wood rim member; and
   i. sixth fastener means connecting said second flange member to said second wood rim member.

4. A rim tie to post connection as described in claim 3 wherein:
   a. said seat member of said rim tie connector is formed with a cut out portion forming an elongated opening inwardly of said first and second back members; and
   b. slant fastening opening means formed in said first and second back members enabling said first and second fastener means to be drive through said slant fastening and opening means at an angle away from said first and second edges and toward the center of said wood post member to prevent wood splitting of said wood post member.

* * * * *